United States Patent
Venter

(10) Patent No.: US 8,100,646 B2
(45) Date of Patent: Jan. 24, 2012

(54) TWO-SHAFT ENGINE FOR AN AIRCRAFT GAS TURBINE

(75) Inventor: Gideon Venter, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 466 days.

(21) Appl. No.: 12/453,623

(22) Filed: May 15, 2009

(65) Prior Publication Data
US 2010/0080700 A1 Apr. 1, 2010

(30) Foreign Application Priority Data
May 16, 2008 (DE) .................. 10 2008 023 990

(51) Int. Cl.
*F04D 29/046* (2006.01)
(52) U.S. Cl. .......... 415/229; 416/174; 384/461
(58) Field of Classification Search .......... 415/229, 415/104, 107; 416/174; 384/461, 445, 504
See application file for complete search history.

(56) References Cited

U.S. PATENT DOCUMENTS

| 3,486,328 A | 12/1969 | Boudigues | |
| 3,779,486 A * | 12/1973 | Lewis et al. .......... | 244/53 R |
| 3,844,110 A | 10/1974 | Widlansky | |
| 6,378,293 B1 | 4/2002 | Care | |
| 6,471,491 B1 * | 10/2002 | Ono et al. .......... | 417/269 |
| 2002/0127119 A1 * | 9/2002 | Ono et al. .......... | 417/269 |

FOREIGN PATENT DOCUMENTS

| DE | 2034188 | 2/1971 |
| DE | 2408839 | 8/1974 |
| DE | 3933776 | 4/1991 |
| EP | 1031715 | 8/2000 |
| GB | 1171966 | 11/1969 |
| GB | 1301282 | 12/1972 |

* cited by examiner

*Primary Examiner* — Gary F. Paumen
(74) *Attorney, Agent, or Firm* — Timothy J. Klima; Shuttleworth & Ingersoll, PLC

(57) ABSTRACT

On a two-shaft engine for an aircraft gas-turbine with a central low-pressure shaft, with a high-pressure shaft co-axially surrounding the low-pressure shaft and with bearing units supporting the shafts on the engine casing, the bearing loads of the high-pressure shaft are directed upstream towards the fan and the bearing loads of the low-pressure shaft are directed downstream. In order to reduce axial bearing load of the high-pressure bearing unit, the oppositely directed bearing loads of the low-pressure shaft (3) and of the high-pressure shaft (6) partly compensate one another, in that the front thrust bearing unit (10) of the high-pressure shaft (6) is supported on the engine casing (1) and the front thrust bearing unit (12) of the low-pressure shaft (3) is supported on the high-pressure shaft (6).

11 Claims, 1 Drawing Sheet

TWO-SHAFT ENGINE FOR AN AIRCRAFT GAS TURBINE

Figure 1:
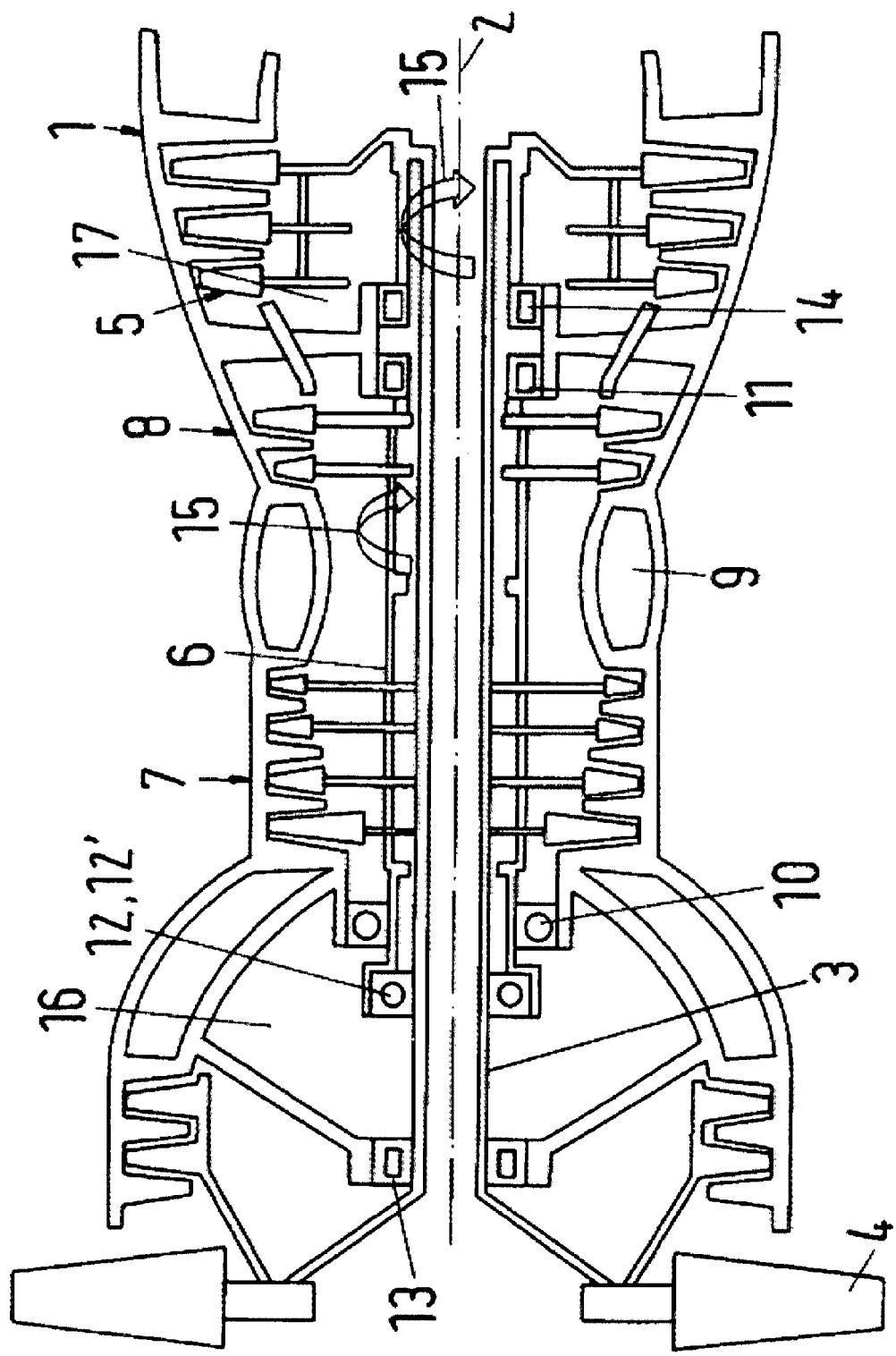

This application claims priority to German Patent Application DE102008023990.9 filed May 16, 2008, the entirety of which is incorporated by reference herein.

This invention relates to a two-shaft engine for an aircraft gas-turbine with a central low-pressure shaft, a high-pressure shaft co-axially surrounding the low-pressure-shaft and with bearing units to support the shafts on the engine casing, with the bearing load of the high-pressure shaft being directed upstream towards the fan and the bearing load of the low-pressure shaft being directed downstream, i.e. opposite to each other.

On known two-shaft engines of the generic type, thrust bearing units are required to axially locate the respective shafts as these are subject to the thrust loads of both the low-pressure and the high-pressure system of the two-shaft engine. In engine operation, the thrust load of the high-pressure system is directed upstream, i.e. forwards towards the fan, while the thrust load of the low-pressure system is directed downstream, i.e. rearwards. On two-shaft engines of this type, the thrust load of the high-pressure system acts oppositely to the thrust load of the low-pressure system. Also, the thrust load of the high-pressure system exceeds the thrust-load of the low-pressure system. On conventional two-shaft engines, single-row thrust bearing units are used to carry both the axial and the radial thrust loads.

The shafts of the high-pressure and the low-pressure system are borne independently of each other and are oil-damped without any interaction. The bearing loads of each of the systems are transmitted to the engine structure or the engine casing, respectively, by the corresponding thrust bearing units.

If the engine geometry is optimized for high power, the thrust load of the high-pressure system exceeds the bearing capacity by a considerable amount. In order to reduce the bearing loads to an acceptable level, the engine design must be altered which, in general, entails a reduction of engine performance and a considerable increase in engine weight.

Conventional engine designs are limited in thrust load-carrying capacity of the high-pressure thrust bearing unit. In order to reduce the thrust loading of the bearing units, the diameter of the high-pressure turbine must be increased, which, in the case of a ducted design, leads to a corresponding reduction of engine performance and an increase in weight and costs.

The sealing system must accordingly be adapted to account for the thrust loads. Such adaptation requires more sealing air, with the corresponding effect on engine performance and fuel consumption.

The following circumstances make a simple increase of the bearing dimensions very difficult:
  The currently used bearing steels are already at the limit of the bearing material properties. The use of ceramic bearings enables loads and speeds to be increased, but not to the extent that actually would be required.
  The rotational speed of the high-pressure system limits the dimensions of the bearing elements. The centrifugal force on essentially the roller elements is limited by the capacity of the bearing material.
  The configuration of the engine (core air gas path) limits the radial dimensions of the bearing. The larger the bearing, the more forward toward the fan must it be arranged. This requires that the high-pressure compressor shaft must be extended, with a negative effect on the strength of the shaft and the speed limits.

It is also disadvantageous that the high-pressure shaft bearing, due to its limited service life, impairs the performance of the engine as a whole. This means that the high-pressure shaft bearing is crucial for the design of the engine.

The low-pressure bearing unit is generally oversized to account, among others, for an imbalance of the fan which may occur in the event of a fan blade failure.

It is a broad aspect of the present invention to provide for a reduction of the bearing load of the high-pressure bearing unit in order to avoid the above mentioned disadvantages of conventional two-shaft engines.

It is a particular object of the present invention to provide for oppositely directed bearing loads to act from the low-pressure shaft to the high-pressure shaft. The resultant thrust load of the high-pressure system then amounts to only part of the capacity of the bearing at the full load normally applicable to the high-pressure bearing unit.

This is achievable by redispositioning the thrust bearing unit of the low-pressure shaft to an intermediate shaft high-pressure and low-pressure thrust load bearing. The intermediate shaft bearing can be arranged either in the front or in the rearward, or rear bearing chamber of the engine casing.

This enables the high-pressure turbine and other components to be optimized, resulting, in a ducted design, in a corresponding increase of engine performance and a reduction of weight and costs.

In a further development of the present invention, the front thrust bearing unit of the high-pressure shaft is supported on the engine casing and the front thrust bearing unit of the low-pressure shaft is supported on the high-pressure shaft. By supporting the low-pressure bearing unit on the high-pressure shaft, the opposing forces of the high-pressure bearing unit and the low-pressure bearing unit are compensated. The previously applied low-pressure ball bearing is then replaced by a low-pressure shaft roller bearing which is capable of carrying high radial, but only minimum axial forces.

Thus, the high-pressure axial load is partly compensated by the low-pressure axial load. This enables the size of the turbine to be reduced without impairing its performance, resulting also in a reduction of weight and an increase in efficiency, i.e. utilization of energy.

In the following, the present invention is more fully described in light of the accompanying drawing showing an example of a two-shaft engine for an aircraft gas turbine.

FIG. 1 shows a schematic sectional view through a two-shaft engine in the longitudinal direction.

The two-shaft engine shown includes a casing 1 with a low-pressure shaft 3, borne therein in the engine axis 2, having an inlet-side engine fan 4 and an outlet-side low-pressure turbine 5. A high-pressure shaft 6 co-axially surrounding the low-pressure shaft 3 has a high-pressure compressor 7 and a high-pressure turbine 8 between which a combustion chamber 9 is arranged in the casing 1. The low-pressure shaft 3 and the high-pressure shaft 6 rotate in the same sense, as indicated by the two rotational direction arrows 15.

The high-pressure shaft 6 is borne immediately on the casing 1, upstream of the high-pressure compressor 7 in a front bearing chamber 16 of the casing 1 by a thrust-bearing unit 10 provided as high-pressure ball bearing and downstream of the high-pressure turbine 8 in a rear bearing chamber 17 by a rear bearing unit 11 provided as high-pressure roller bearing.

The low-pressure shaft 3 is borne on the high-pressure shaft 6 on the upstream side in the forward bearing chamber 16 in the casing 1 immediately adjacent to the thrust-bearing unit 10 for the high-pressure shaft 6, provided as a high-pressure ball bearing, by a thrust-bearing unit 12 provided as a low-pressure ball bearing which can also be referred to as low-pressure/high-pressure intermediate shaft bearing 12'. Furthermore, the low-pressure shaft 3 is borne directly on the casing 1 immediately downstream of the engine fan 4 in the front bearing chamber 16 and immediately upstream of the low-pressure turbine 5 in the rear bearing chamber 17 in the casing 1 by low pressure roller bearings 13 and 14, respectively.

The axial bearing load of the high-pressure shaft 6 is partly compensated by the bearing load of the low-pressure shaft 3 in that the thrust-bearing unit 12, which is provided as a low-pressure ball bearing, of the low-pressure shaft 3 is supported immediately on the high-pressure shaft 6 and on the upstream side of the thrust-bearing unit 10, which is provided as a high-pressure ball bearing, of the high-pressure shaft 6, with the thrust-bearing unit 10 being supported immediately on the casing 1.

Alternatively, the thrust bearing unit 12, which is provided as low-pressure ball bearing or the intermediate shaft bearing 12' of the low-pressure shaft 3, respectively, can be arranged both in the rear bearing chamber 17 near the rear bearing unit 11, which is provided as high-pressure roller bearing, of the high-pressure shaft 6 and between the front and rear bearing units 10 and 11, respectively, of the high-pressure shaft 6.

List of Reference Numerals
1 Casing
2 Engine axis
3 Low-pressure shaft
4 Engine fan
5 Low-pressure turbine
6 High-pressure shaft
7 High-pressure compressor
8 High-pressure turbine
9 Combustion chamber
10 Thrust bearing unit (high-pressure ball bearing)
11 Rear bearing unit (high-pressure roller bearing)
12 Thrust bearing unit (low-pressure ball bearing)
12' Intermediate shaft bearing
13 Front bearing unit (low-pressure roller bearing)
14 Rear bearing unit (low-pressure roller bearing)
15 Rotational direction arrow
16 Front bearing chamber
17 Rear bearing chamber

What is claimed is:

1. A two-shaft engine for an aircraft gas-turbine, comprising:
   an engine casing;
   a central low-pressure shaft;
   a high-pressure shaft co-axially surrounding the low-pressure-shaft; and
   a plurality of bearing units supporting the shafts on the engine casing;
   wherein at least one of the bearing units is positioned with respect to the high pressure shaft and the low pressure shaft such that an upstream directed bearing load of the high-pressure shaft and an opposing downstream directed bearing load of the low-pressure shaft at least partially offset one another and reduce axial loading on another of the bearing units supporting axial loading of the high pressure shaft.

2. The two-shaft engine of claim 1, and further comprising:
   a thrust bearing unit for the high-pressure shaft which is supported on the engine casing; and
   a thrust bearing unit for the low-pressure shaft which is supported on the high-pressure shaft.

3. The two-shaft engine of claim 2, wherein the thrust bearing unit for the low-pressure shaft is an intermediate shaft bearing.

4. The two-shaft engine of claim 3, wherein the intermediate shaft bearing of the low-pressure shaft is positioned in a front bearing chamber of the engine near the thrust bearing unit of the high-pressure shaft.

5. The two-shaft engine of claim 3, wherein the intermediate shaft bearing of the low-pressure shaft is positioned in a rear bearing chamber of the engine near the thrust bearing unit for the high-pressure shaft.

6. The two-shaft engine of claim 3, wherein the intermediate shaft bearing of the low-pressure shaft is positioned between a front bearing unit and a rear bearing unit of the high-pressure shaft.

7. A gas turbine engine, comprising:
   an engine casing;
   a low-pressure shaft;
   a high-pressure shaft co-axially surrounding the low-pressure shaft;
   a high-pressure shaft thrust bearing supported on the engine casing;
   a low-pressure shaft thrust bearing supported on the high-pressure shaft to at least partially offset an upstream directed bearing load of the high-pressure shaft with an opposing downstream directed bearing load of the low-pressure shaft to reduce axial loading on the high pressure shaft thrust bearing.

8. The engine of claim 7, wherein the low-pressure shaft thrust bearing is an intermediate shaft bearing.

9. The engine of claim 8, wherein the intermediate shaft bearing is positioned in a front bearing chamber of the engine near the high-pressure shaft thrust bearing.

10. The engine of claim 8, wherein the intermediate shaft bearing is positioned in a rear bearing chamber of the engine near the high-pressure shaft thrust bearing.

11. The engine of claim 8, wherein the intermediate shaft bearing is positioned between a front bearing and a rear bearing of the high-pressure shaft.

* * * * *